United States Patent [19]

Fowells

[11] 3,891,610

[45] June 24, 1975

[54] POLYOLEFIN FIBERS AND PROCESS OF FORMATION DURING POLYMERIZATION

[75] Inventor: Robert W. Fowells, Vancouver, Wash.

[73] Assignee: Crown Zellerbach Corporation, San Francisco, Calif.

[22] Filed: Nov. 8, 1972

[21] Appl. No.: 304,883

Related U.S. Application Data

[63] Continuation-in-part of Ser. No. 874,687, Nov. 6, 1969, abandoned, which is a continuation-in-part of Ser. No. 769,501, Oct. 22, 1968, abandoned.

[52] U.S. Cl........ 260/88.2 R; 260/93.7; 260/94.9 B
[51] Int. Cl.² ........ C08F 210/02; C08F 110/06; C08F 110/02; C08F 4/64
[58] Field of Search .......... 260/94.9 B, 93.7, 88.2 R

[56] References Cited
UNITED STATES PATENTS

| | | | |
|---|---|---|---|
| 3,055,880 | 9/1962 | Raecke............................ | 260/94.9 B |
| 3,119,801 | 1/1964 | Haskell............................. | 260/94.9 F |
| 3,574,138 | 4/1971 | Ziegler et al. .................. | 260/94.9 B |
| 3,743,272 | 7/1973 | Nowotny et al............. | 260/94.9 GD |

OTHER PUBLICATIONS

Kolloid–Zeitschrift und Zeitschrift Fur Polymere, 205, 2 pp. 160–162 (1965).
Die Makromolekulare Chemie, 121, pp 42–50 (1969).

*Primary Examiner*—Joseph L. Schofer
*Assistant Examiner*—A. Holler
*Attorney, Agent, or Firm*—Corwin R. Horton; Stanley M. Teigland; Robert E. Howard

[57] ABSTRACT

Polyolefin fibers, and a process of producing polyolefin fibers during polymerization of an olefin effected by conducting the polymerization in a suitable reaction medium for the polyolefin to be formed in the presence of a coordination catalyst under conditions of high shear stress. The fibers produced have a gross morphology and size similar to natural cellulosic papermaking fibers.

17 Claims, 10 Drawing Figures

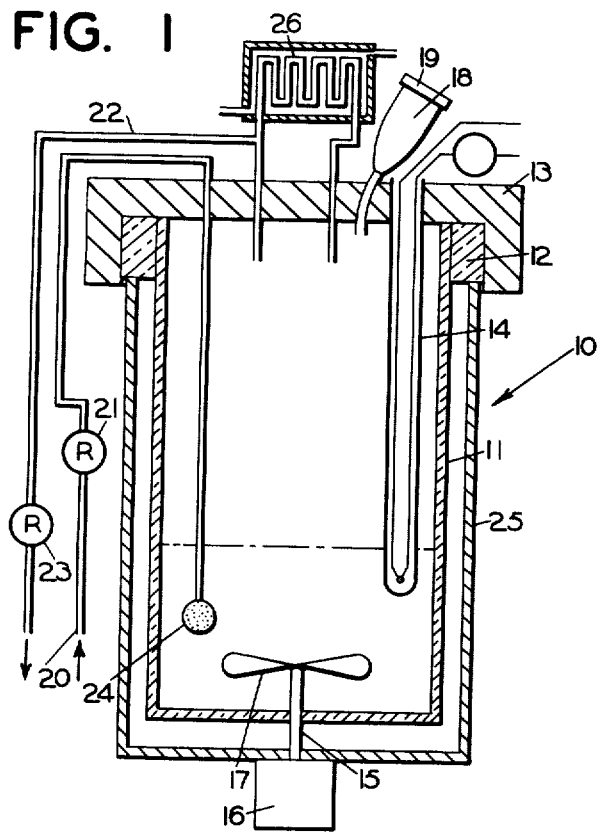
FIG. 1
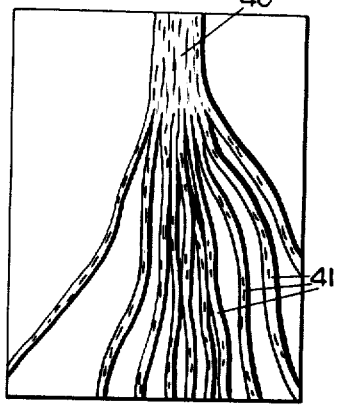
FIG. 2
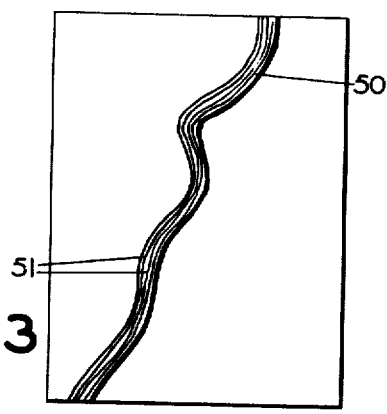
FIG. 3
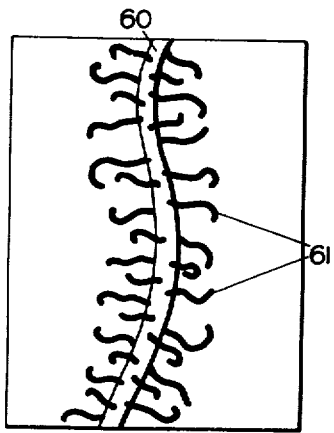
FIG. 4
FIG. 5

⊢

100 microns 100 microns

POLYOLEFIN FIBERS AND PROCESS OF FORMATION DURING POLYMERIZATION

CROSS REFERENCE TO RELATED APPLICATIONS

This is a continuation-in-part of U.S. Pat. application Ser. No. 874,687 filed Nov. 6, 1969, now abandoned, which in turn is a continuation-in-part of Ser. No. 769,501 filed Oct. 22, 1968, now abandoned.

BACKGROUND OF THE INVENTION

The polymerization of olefins into polyolefins is well established in the art. The early processes for the polymerization of ethylene all employed the so-called high pressure procedure to produce low density polyethylene. A major breakthrough in the formation of polyolefins was the discovery by Ziegler that certain catalyst systems comprising a catalyst of titanium tetrachloride in combination with a co-catalyst of an aluminum alkyl permitted the polymerization of ethylene at lower pressures, including atmospheric pressure. The work of Natta established that such catalyst systems could be employed in the polymerization of propylene.

The formation of filamentary polyolefins for use in the textile industry and other arts has been accomplished by extruding melts or solutions of polyolefins through small orifices (spinnerets) with the formation of continuous lengths of filaments. Polyolefin fibers could be formed from these filaments by chopping them into staple.

Another approach to the formation of synthetic polymer "fibers" is that described in U.S. Pat. No. 2,999,788 to Morgan, wherein the tubular filaments produced by U.S. Pat. No. 2,708,617 are subjected to a shredding operation to form so-called "fibrids". However, one aspect of this particular process is limited to condensation-type polymers.

The Morgan patent previously referred to also described a process of forming fibrids by adding a solution of a synthetic polymer to a precipitant for the polymer under conditions such that the system has a precipitation number of at least about 100 and under conditions of violent agitation. This latter process is more fully described in U.S. Pat. No. 2,988,782 to Parrish et al. However, this process requires the use of a large amount of solvent and pre-formed polymers.

Recently, work has been carried out by R. St. John Manley et al. concerning the morphology of nascent Ziegler-Natta polyolefins. Manley et al. studied polyolefin "fibrils" formed both by stirrer crystallization at low agitation and polyolefin fibrils formed without agitation. Manley et al. found that the gross morphology of both types of fibrils were similar in nature, and comprised a lamellar overgrowth on a central filament, somewhat similar to the "shish-kabobs" observed earlier by Pennings for fibrils formed forom polyolefin solutions. These shish-kabobs are less than about 1.0 micron in diameter.

More recently, the formation of polyolefin "microfibers" has been reported by the Shell Research Laboratories at Ormston, Manchester, United Kingdom. These microfibers are formed with the aid of so-called "soluble" vanadium catalysts in the absence of any agitation resulting in a gelatinous material which, upon drying and electron microscopic examination, reveals that it is formed of a microfibrous structure.

While it has thus been suggested in the art to make fibrils, fibrids and microfibers, there is no teaching in the prior art of directly forming discrete polyolefin fibers during polymerization that are similar in gross morphology and size to natural cellulosic papermaking fibers.

SUMMARY OF INVENTION

It is the principal object of the present invention to provide discrete polyolefin fibers, particularly fibers having a gross morphology and size similar to natural cellulosic papermaking fibers. It is a further object of the present invention to provide a process for producing polyolefin fibers during polymerization of the olefin.

By the process of the present invention "nascent" polyolefin fibers during the polymerization of the monomeric olefin by conducting the polymerization at a relatively rapid reaction rate, in a suitable reaction medium for the polyolefin to be formed, in the presence of a coordination type catalyst and under conditions of high shear stress.

The term "nascent polyolefin fibers" is defined as fibers formed during the polymerization of olefins, and it is not intended to include fibers formed by melt or solvent spinning of polymers, or fibrids produced by precipitation of polymers from solution, nor is it intended to include fibrils per se, which are of much smaller size. The work "fiber" is intended to mean polymeric particles having a length to diameter ratio greater than 1.0 and preferably greater than about 40 as opposed to non-fibrous particles, or "crumb" having a length to diameter ratio of 1.0.

DESCRIPTION OF DRAWING

FIG. 1 is a schematic representation of an apparatus suitable for carrying out the process of the present invention;

FIGS. 2 to 5 are schematic representation of some of the polyolefin fibers produced by the process of the present invention;

DESCRIPTION OF PREFERRED EMBODIMENTS

Figure 6:
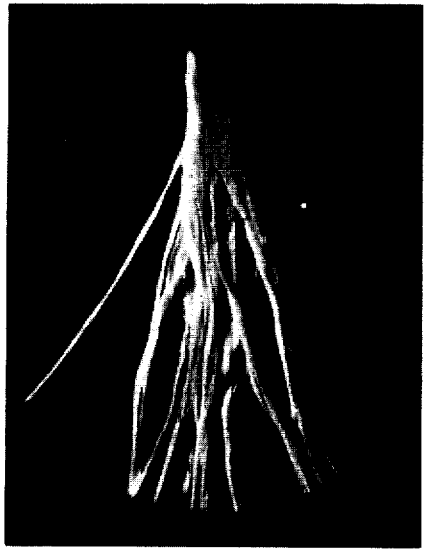
FIGS. 6 to 10 are exemplary microphotographs of fibers produced by the process of the present invention.

Prior to discussing the details concerning the process, materials and conditions, aa brief description of one type of suitable apparatus for carrying out the process of the present invention is believed in order. Reference is made to FIG. 1 of the drawing in which reference numeral 10 refers to the reactor, in general. The reactor 10 is comprised of a reaction vessel 11 fitted with a ground glass collar 12. A resin kettle lid 13 is located on top of the reactor, sealing it from the atmosphere. Located inside the reaction vessel is a thermocouple well 14. Through the bottom of cooling jacket 25 and reaction vessel 11 is a shaft 15 attached at the outside end thereof to a variable speed motor 16 and having at the other end thereof an agitator blade 17. Side arm 18 protrudes through the lid 13 into the interior of the reactor and is fitted at the outside end with a serum cap 19 for catalyst addition via hypodermic syringe. Monomer inlet 20 traverses through the lid 13 and is fitted with a rotameter 21 for measuring gaseous monomer flow rates. The end of monomer inlet conduit 20 located inside the reaction vessel is fitted at its extremity with a fitted glass dispersion tip 24 to effect disperion of the gaseous monomer in the polymerizing solvent. Excess gaseous monomer is withdrawn from the reactor via conduit 22 which is likewise fitted with a rotameter 23 to measure the exit gaseous monomer flow rate. Reflux condenser 26 returns condensables to the reaction vessel 11.

The operation of the apparatus illustrated in FIG. 1 will be described in more detail later with reference to specific examples.

Olefins suitable for use in the present invention

Any of those monomeric olefins which can be polymerized by the employment of a coordination type catalyst are employable in the process of the present invention; however, the preferred olefins are the mono-olefins, ethylene and propylene. Other olefins which may be employed are diolefins such as butadiene and isoprene; alpha olefins such as 1-butene, 1-pentene, 1-dodecene, and 4-methyl-1-pentene; cyclic olefins such as vinycyclohexane; and aryl olefins such as styrene. In addition to forming fibrous homopolymers of the foregoing olefins, fibrous copolymers and block copolymers may be formed by employment of mixtures of the foregoing olefins.

Polymerization reaction medium employed in the present invention

It has been found that the nature of the reaction medium employed in the polymerizations of the present invention is important to the formation of polyolefin fibers. The medium employed should be a suitable reaction medium for the polyolefin to be formed during the polymerization reaction. Illustrative of suitable solvents employable as the reaction medium in the present process include cyclohexane, decalin, tetralin, chlorinated solvents, toluene, isoctane, $m$, $o$ and $p$-xylene, mineral oils Socal 1 (a mixture of normal and branched aliphatic hydrocarbons, naptha and aromatics) aliphatic hydrocarbons such as heptane and hexane, and mixtures thereof.

By the term "suitable reaction medium" it is intended to mean a composition in which the polyolefin to be formed is swellable or soluble to a significantly measureable extent. A detailed discussion of swellability or solubility of polyolefins in various "solvents" will not be gone into in great detail since such information is well within the skill of the artisan and treated in numerous texts. See, for example P. IV-344 of the "Polymer handbook" reference, cited below. Generally swellability is determined by immersing a predetermined amount of polyolefin in the solvent, and, after equilibrium is established, or some finite time has passed, the polyolefin is removed, blotted, and the amount of solvent absorbed measured. Swellability or solubility of polyolefins in various solvents is dependent upon such factors as temperature and degree of cross-linking, among others. It has been found that solvents in which the polyolefin to be formed is not swellable or soluble to a significantly measurable extent at temperatures up to about 105°C do not permit the formation of polyolefin fibers. By "significantly measurable" extent is meant that the measured amount of solvent absorbed by the polyolefin at equilibrium or after some finite time is greater than that amount (about 0.5 percent by weight) which could be reasonably classified as due to experimental error rather than actual absorption.

A more accurate characterization of a suitable reaction medium is the "solubility parameter" ($\delta$) or "cohesive energy density" ($\delta^2$) of the solvent. The cohesive energy density is especially useful for predicting the solubility and solvent sensitivity of polymers. Polyolefins are soluble only in those solvents whose solubility parameter or cohesive energy density is not too far different from its own.

For a detailed discussion of the theory and mathematics of cohesive energy density and solubility parameter, reference is made to Polymer Handbook, edited by Brandup & Immergut, Interscience Publishers, 1966, pp. IV-341-368; and to "Encyclopedia of Polymer Science and Technology", Vol. 3, Interscience Publishers, pp 833 – 862.

Solubility parameter values for polyolefins are to be found in Table 4, pp IV-362-367 of Polymer Handbook, cited above. For example, a polyethylene has a solubility parameter between about 7.7 and 8.35 $(cal/cc)^{1/2}$; polypropylene between about 7.9 and 8.2 $(cal/cc)^{1/2}$.

In order to qualify as a suitable reaction medium for forming polyethylene fibers in accordance with the present process the solubility parameter of the solvent chosen should be as close as possible to the 7.7 – 8.35 $(cal/cc)^{1/2}$ solubility parameter range of polyethylene, most preferably between about 6.5 and 9.5 $(cal/cc)^{1/2}$, and probably should be within the range of about 6.0 to 10.0 $(cal/cc)^{1/2}$.

Similarly, the reaction medium chosen for polypropylene fiber production should have a solubility parameter approaching 7.9 to 8.2 $(cal/cc)^{1/2}$. The preferred range is between about 6.5 and 9.5 $(cal/cc)^{1/2}$ and probably should be within the range of about 6.0 to 10.0 $(cal/cc)^{1/2}$.

While the reaction medium chosen should have a solubility parameter approaching that of the polyolefin formed, for polyolefins other than polyethylene the reaction medium thus chosen should not have a solubility parameter so close to that of the polyolefin as to cause dissolution of the polyolefin fibers. The reason this precaution does not apply to polyethylene is due to the large enthalpy of fusion of polyethylene, whereby there is no problem of polyethylene fiber dissolution, below the melt dissolution temperature. However, for other polyolefins having a small enthalpy of fusion, any fibers formed may be quickly dissolved if the solubility parameter of the reaction medium chosen approaches too close to the solubility parameter of the polyolefin to be formed.

It should be noted that since the solubility parameters reported in literature references (such as Polymer Handbook, Tables 1 and 2, pp IV - 347-358, cited above) are calculated from heats of vaporization at 25°C., different values will be obtained at more elevated temperatures. At such elevated temperatures, the solubility parameter may approach close enough to that of the polyolefin to be formed to be a useful reaction medium, whereas at lower temperatures it would not be useful. The upper limit on temperature for fiber formation is the melt dissolution temperature since as this temperature is approached, the fibers are detrimentally affected.

In addition, the rate of reaction at a given catalyst concentration has an affect on the range of solubility parameters that permits fiber formation. In general, the greater the rate of reaction at a given catalyst concentration, the broader is the range of solubility parameters permitting such fiber formation. The further removed from the optimum solubility parameter, the greater the reation rate will have to be and the narrower will be the operating limits for producing fibers. The particular catalyst employed will have an effect on the solubility parameter range suitable for producing fibers inasmuch as the catalyst affects the reaction rate.

The solubility parameter for solvents may be calculated for any temperature from tables of heats of vaporization as a function of temperature by employing the relationships $\Delta E = \Delta H - RT$
$\delta = (\Delta E/V)^{1/2}$ where
$\Delta E$ = energy of vaporization to a gas at zero pressure
$\Delta H$ = heat of vaporization at temperature T°K
$R$ = gas constant
$\delta$ = solubility parameter in $(cal/cc)^{1/2}$ of solvent
$V$ = molar volume.

The solubility parameter of polyethylene at any given temperature T may be determined by the equation $\delta_{pe} = 8.4822 - 0.00642 \times (T)$ where K is an empirical constant which is the slope of the curve obtained by plotting temperature versus solubility parameter, and T is the temperature in °C.

An alternate approach to the definition of solubility characteristics of solvents useful in the practice of the present invention is difference in solubility parameter $(\delta_s - \delta_p)$ of the solvent $(\delta_s)$ and polyolefin $(\delta_p)$. The heat of mixing of solvent and polyolefin is dependent upon the quantity $(\delta_s - \delta_p)^2$. If the heat of mixing is not so large as to prevent mixing, then $(\delta_s - \delta_p)^2$ has to be relatively small. For polyethylene, it has been determined that $(\delta_s - \delta_p)^2$ should preferably be less than about 3.0 (cal/cc) for fiber formation, and preferably less than about 1.5.

Catalyst composition

There are numerous coordination catalyst systems conventionally employed in the polymerization of olefins. The Ziegler type coordination catalyst systems are generally a combination of a catalyst and a co-catalyst. The catalyst is a compound (usually an oxide or halide) of a transition metal from Groups IVB – VIIIB and Group VIII of the Periodic Chart and the co-catalyst is a metal alkyl where the metal is from Groups IA, IIA, IIB or IIIA of the Periodic Chart. The Periodic Table referred to is that in Handbook of Chemistry by Lange, 7th edition, pages 58 and 59. It is believed that any conventional Ziegler-type catalyst system may be employed in the present process, such as those in Belgian Pat. Nos. 533,362, 534,792 and 534,888.

Certain catalysts and co-catalysts have been found to be especially useful. Preferred catalysts, in order of increasing activity in fiber formation, are titanium trichloride, titanium tetrachloride, vanadium tetrachloride and vanadium oxytrichloride. Preferred co-catalysts, in order of increasing activity, are dialkyl aluminum halides such as dethyl aluminum chloride and trialkyl aluminum compounds such as triethylaluminum.

The ratio of co-catalyst to catalyst (i.e. Al : Ti or Al :V) employed is preferably in the range of 1 : 1 to 3 : 1, although ratios as low as about 0.4 : 1, and as high as 12 : 1 or higher (with vanadium catalysts) are employable.

The catalyst concentration employed in the reaction medium is not per se critical to fiber formation, and those familiar with coordination catalysts can readily determine the optimum concentration to employ for a given set of reaction conditions as disclosed herein. However, it is important for fiber formation to present sufficient monomer to the polymer propagation sites on the catalyst to effect a relatively rapid rate of polymer formation. The amount of monomer transported to such sites depends, in part, on the degree of agitation (or mixing) of the reaction mass. If the degree of agitation is relatively high, the amount of monomer transported is relatively high, and therefor a relatively high concentration of catalyst can be employed. Where the degree of agitation is relatively low, the transport of monomer is low, thereby resulting in a lower reaction rate at a given catalyst concentration. In the latter situation it may be necessary therefor to lower the catalyst concentration in order to increase the reaction rate to the level where fiber formation occurs. This will be elaborated upon in the discussions on shear stress and reaction rate. The catalyst concentrations set forth in the examples of from 1 to 10 mMoles/ liter are for conditions of relatively high agitation. Under conditions of lower agitation, lower catalyst concentrations would be employed to maintain a relatively high reaction rate, and concentrations as low as 0.05 mMoles/ liter or lower might be employed in such circumstances.

Another factor involved is the pressure maintained in the reactor. Catalyst concentrations too high to effect fiber formation at atmospheric pressure could be employed if the pressure of the system were increased since it is known that catalyst efficiency (and therefor olefin conversion) increases almost linearly with the pressure of the reactor system.

While the formation of nascent polyolefin fibers is described herein with specific reference to Ziegler-type coordination catalysts, it is believed that other types of coordination catalysts are also suitable. Exemplary of these are the Phillips catalysts and the catalysts of the Standard Oil Company of Indiana. The Phillips solution process is described in U.S. Pat. No. 2,825,721; the Phillips slurry process is described in British Pat. No. 853,414. The Standard Oil process is described in U.S. Pat. Nos. 2,691,647 ; 2,726,231 ; 2,726,234 ; 2,728,758 ; 2,773,053 ; 2,791,575 ; 2,795,574; and 2,834,769.

Pressure

The pressure employed in the polymerization reactor may be any pressure conventionally employed for the particular type of olefin to be polymerized and the coordination catalyst used. However, it may be desirable to employ slightly higher pressures than conventionally employed in order to increase the reaction rate. Thus, if a Ziegler-type coordination catalyst is employed, and the olefin is ethylene or propylene, pressures conventionally employed are generally 1 – 2 atmospheres; for the process of the present invention, such pressures may also be employed, but if it is desired to increase the reaction rate, higher pressures of up to 100 atmospheres or higher may be employed. For the Phillips solution and slurry processes, pressures may typically range up to 35 atmospheres. In the Standard Oil polymerization process, pressures in the range of 35 – 105 atmospheres are typically employed.

Temperature of polymerization

The temperature of the polymerization was not found to be per se critical to the polymer yield or percentage of fiber produced. However, the polymerization is exothermic and if the reactor temperature is not controlled, the fibers may become hot enough to fuse together. As mentioned previously, the upper limit on temperature for fiber formation is the melt dissolution temperature. Adhesion appears to occur at temperatures of about 105°C and above for polyethylene in decalin. Temperatures as low as about 4°C have been employed. The optimum temperature to be employed is readily determinable for any particular olefin, solvent and other reaction conditions. It has been found that fiber morphology is affected by the polymerization temperature. At lower temperatures (i.e., lower than 30°C) shorter, less agglomerated fibers are obtained. At higher temperatures (i.e., 60° – 80°C) longer fibers are obtained.

Shear stress of the reaction mass.

One of the principal factors contributing to the successful formation of polyolefin fibers has been found to be the shear stress to which the reaction mass is subjected during polymerization. Shear stress is essential to successful fiber formation. The mechanism of fiber formation relative to shear stress is not understood. However, it is hypothesized that by subjecting the reaction mass to a sufficient shear stress, the nascent polyolefin microfibrils are not permitted to fold back upon themselves to thereby form globules of polymer, as has been described for conventional polyolefin polymerization. Instead, due to the shear stress, the microfibrils are stretched out into long chains of fibrils which aggregate themselves into fibers.

The minimum shear stress required for the formation of fibers is dependent somewhat upon the olefin being polymerized and upon the type of Ziegler catalyst employed. The minimum shear stress required for fiber formation is readily determinable by employing the procedures and apparatus described herein for any particular olefin, catalyst, pressure and temperature at increasing agitator blade velocities, until fiber formation is noted on the agitator blades (the zone of highest shear). The agitator blades employed for determining minimum shear stress with the apparatus described should be as close as possible to flat plates in shape and at zero angle of incidence to the flow of fluid past them whereby the minimum shear stress for fiber formation can then be calculated by employing the following equation:

$$T = C_f \cdot \frac{dv^2}{2} \cdot \frac{1}{g}$$

where
 $T$ = mean shear stress at the flat blade agitator surface
 $v$ = mean velocity of main bulk of fluid
 $d$ = fluid density
 $C_f$ = mean drag coefficient for total dimensions of the blade in the direction of flow
 $g$ = gravitational constant The minimum shear stress for fiber formation is dependent upon other reaction conditions, and therefore an absolute figure for such minimum shear stress cannot be given. However, in order to form satisfactory fibers for use in papermaking, the minimum shear stress should generally be in the range of 0.1 to 1.5 lbs. (force)/square foot (i.e., always greater than 0.1 lbs (force)/sq.ft. and preferably greater than about 1.5 lbs (force)/sq.ft. for most reaction conditions and for most olefins.

For polyethylene, the minimum shear stress for fiber formation has been calculated to be about 1.5 lbs (force)/sq.ft. under the reaction conditions of example 16. As the shear stress increases above the minimum shear stress required for fiber formation, the fibers tend to become longer. Although no upper limit of shear stress has been discovered beyond which no fiber formation occurs, there are obviously upper limits imposed by practical considerations such as equipment limitations and size of fiber desired. Also, at extremely high rates of shear, fibers may be torn apart, which may not be desirable. For laminar flow in the boundary layer adjacent the blade in the system described, the Reynolds number ($R_e$) will be less than about $4 \times 10^5$. The Reynolds number for the system illustrated in FIG. 1 may be determined by the following equation:

$$R_e = \frac{W \cdot V_o \cdot P}{\mu}$$

where
 $W$ = average blade width (ft.)
 $v_o$ = mean velocity of the blade
 $P$ = density of fluid, lb. (mass)/ft$^3$
 $\mu$ = viscosity of fluid, lb. (mass)/ft.sec.

While shear stress is easily measured in simple shear devices, such as a cylindrical rotor rotating in a cylinder or flat blade stirrer, it is very difficult to measure in more complex geometries. Also, the exposure of any particular portion of a body of liquid to the shear zone is a complex consideration. Therefore, a relatively simple method of measuring shear stress in any shear geometry has been devised. This method is based upon the employment of microcapsules which rupture only at the critical shear stress of 0.1 pounds (force)/sq.ft. (5 newtons/sq. meter) or greater, and is described below for determining the shear stress in an unknown shear system at 26°C. suitable microcapsules are those designated H-85 and obtained from Balchem Corporation of Slate Hill, New York. These microcapsules pass a 16 mesh Tyler screen but are retained on a 20 mesh screen. These microcapsules are elliptical shaped with some concavities. The major axis is 1203.6 (standard deviation of 141.3) and the minor axis is 1041.4 (standard deviation of 92.7). The shell wall thickness of the microcapsules prior to treatment is 33.1 (standard deviation of 13.0). They have a gelatin shell and contain 42.6 percent by weight toluene.

These microcapsules are soaked in a 35.5 percent by weight mixture of water in isopropanol for one hour. They are then placed on a screen and dipped into isopropanol for five seconds to reharden the gelatin shell. The amount of toluene lost due to the soaking is determined by analysis of the soaking liquid, and the amount remaining in a given quantity of capsules determined.

The microcapsules are then placed into 260 cc of cyclohexane in a cylindrical vessel 8 inches in height and 3.028 inches in diameter. The microcapsules are added to give a concentration of 0.2 grams/liter. The vessel has a coaxially disposed rotor 2.838 inches in diameter and 8 inches long. The gap between the rotor and vessel wall is 0.2413 cm. The temperature of the cyclohexane is 26°C. (viscosity of 0.884 centipoises). The rotor is rotated at 3615 rpm for 5 seconds. The shear stress in the gap is 0.1 pounds (force)/sq.ft. (5 newtons/sq.meter). The quantity of capsules that ruptured is determined by the amount of toluene present in the cyclohexane. The quantity of capsules rupturing is substantially independent of time of exposure to the shearing action.

Capsules thus prepared may then be placed into any shear system in an amount of 0.2 grams/liter and the system subjected to the shear employed in the process for the usual process time and at a temperature of 26°C. The quantity of capsules ruptured is then determined by analyzing for toluene by conventional analytical techniques such as gas chromatography or ultraviolet spectroscopy. If the quantity that rupture is equal to or greater than the quantity rupturing in the known shear zone, then the shear in the unknown shear zone is equal to or greater than the known shear stress.

It has been determined that to form fibers more than 80 percent and preferably more than 95 percent by weight of the quantity of the capsules rupturing in the known shear zone capsules should rupture in the unknown shear system. This means that a significant portion of the system has been exposed to a shear stress greater than 0.1 pounds (force)/sq.ft. These percentage limits were determined by employing the following concepts: A fraction ($S$) of fluid passes through the shear zone during each cycle. The fraction not passing through the shear zone is ($1-S$), and the fraction not passing through the shear zone after ($n$) cycles is ($1-S$)$^n$. The number of cycles ($n$) is calculated from the total time and the number of cycles per unit time ($w$).

This latter quantity ($w$) is determined by the tracer technique described in Chapter 9 of Chemical Reaction Engineering, Octave Levenspiel, John Wiley & Sons, Inc., N.Y., 1962, using the relationship:

$$w = \frac{1}{t\, E(t)\, dt}$$

wherein
$w$ = number of cycles per unit time
$t$ = time
$E(t)$ = first passage time distribution of tracer through the shear zone.

The fraction of capsules passing through the shear zone (determined by the amount of toluene released since a known quantity of capsules passing through a shear zone in excess of 0.1 pounds (force)/sq.ft. rupture) is $1-(1-S)^n$. From experimental data is has been found that if $1-(1-S)^n$ is greater than 0.80 (i.e., 80 percent of the capsules rupture), and preferably greater than 0.95, fibers are formed.

While specific microcapsules are described above for determining whether the critical shear stress of 0.1 lbs (force)/sq.ft. is exceeded or not in an unknown system operated at 26°C, any microcapsule containing a material which can be measured in the sheared medium can be employed by following the same general procedure. The gelatin shell thickness and/or hardness can be reduced to proper value for rupturing at 0.1 lbs (force)/sq.ft. by the water-isopropanol soaking technique described above. This is done by using various concentrations of water in isopropanol and determining whether or not the capsules rupture under 0.1 lbs (force)/sq.ft. at a given temperature in a known shear stress zone such as the rotor-cylinder apparatus described above. Once the appropriate microcapsules are formed, they may then be reproduced for use in testing the shear stress in the unknown system at the same temperature of operation. The microcapsules can be designed by this technique to rupture at about any shear stress level for a given temperature and a fairly accurate determination of shear stress made in the unknown system by analyzing a series of microcapsules rupturing under known shear stress levels.

RATE OF REACTION

The rate of reaction of olefin into polyolefin must be relatively rapid in order to form fibers instead of crumb. It appears also that the faster the reaction rate, above that minimum necessary to form fibers, the better the quality of fibers formed. The reaction rate per unit of catalyst, or apparent specific rate, may be mathematically described by the expression $dM/C_o dt$ or, alternatively, $C_o^{-1}\, dM/dt$ where M is monomer consumed in millimoles, $t$ is time in seconds, and $C_o$ is initial amount of catalyst in millimoles.

The apparent specific rate is dependent upon the catalyst type, concentration of monomer in the reaction medium, temperature and pressure.

Since the minimum apparent specific rate necessary to form fibers from any particular olefin is dependent upon all of the aforementioned variables, an absolute value therefor cannot be set forth. The minimum apparent specific rate required for fiber formation for a particular olefin and catalyst system at any particular temperature and pressure must be determined for each set of variables chosen within the limits of each variable as specified herein. Since a selection of olefin, catalyst, temperature and pressure leaves monomer concentration in the reaction medium as the remaining variable determining the apparent specific rate, it is usually this variable in practice which determines whether or not the minimum rate for fiber formation is achieved. The concentration of monomer in the medium in turn depends upon the rate of monomer being fed into the medium, the nature of the medium (solubility of monomer therein) and the degree of agitation of the medium (dispersion of monomer therein). Since an excess of monomer is usually fed into the medium, and since the reaction medium is chosen within the parameters previously discussed, in practice the apparent specific rate is determined by adjusting the degree of agitation. The agitation necessary for fiber formation will be satisfied if the shear stress requirements specified herein are satisfied.

This is not to say that the other variables cannot be employed in practice to obtain a reaction rate sufficiently high to effect fiber formation. For example, if it is determined that for a particular set of chosen variables the shear stress must be so high as to be impractical, then the temperature or pressure of the system may be increased to increase monomer solubility in the reaction medium, thereby increasing monomer concentration and raising the apparent specific rate. Alternatively, a more active coordination catalyst may be substituted to thereby increase the apparent specific rate.

Numerous examples of reaction rates for various reaction conditions are set forth in the specific examples contained herein.

As shown in examples 2, 12 and 16 a minimum apparent specific reaction rate of 0.05 sec$^{-1}$ is required under conditions of operation where the other parameters are within the limits previously described and this may be taken as the practical lower limit in the process. In some examples a somewhat higher apparent specific reaction ratio (i.e., 0.2 sec$^{-1}$ in example 15, 1.0 sec$^{-1}$ in example 21 and 1.09 sec$^{-1}$ in example 23) did not suffice to produce fibers due to some other parameter being unfavorable, such as the shear stress being borderline or too low (as in examples 15 and 23) the solvent being borderline with regard to the solubility parameter (example 23) or a combination of unfavorable conditions (as in example 21).

Specific examples for preparation of polyolefins

A. General Procedures - The apparatus illustrated schematically in FIG. 1 and consisting of a one quart Pyrex Waring blender having a resin kettle lid attached to the top thereof via a graded seal and Pyrex tubing having a flange thereon was employed for all of the examples reported below. A suitable substitute of almost identical design having a one liter capacity is commercially available from Lab Glass Inc., Vineland, New Jersey, Blender-Reactor Catalogue No. LG 3350. Since the same general procedure was employed in all the examples, a brief discussion of those procedures will be presented.

The aluminum alkyls and the titanium and vanadium chlorides were diluted to 1 molar solution in the solvent to be employed in the polymerization reactor, and stored in 50-milliliter bottles capped with a self-sealing rubber serum cap. This procedure was carried out in a "dry" box.

The dry box used was a Labconco controlled atmosphere glove box with a recirculation train. Although the recirculation train removed moisture entering due to diffusion through the gloves, minute leaks, etc., it was determined by calculation that a nitrogen purge at a rate of 600 milliliters/minute was necessary to keep the oxygen level below 50 ppm.

The cleaned reactor components illustrated in FIG. 1 were dried in a 100°C oven at least overnight and assembled while still hot. The system was flushed with nitrogen at a rate of approximately 500 milliliters per minute overnight to insure complete removal of oxygen and residual moisture. After the polymerization solvent was added, which in all runs amounted to 500 ml., nitrogen was bubbled therethrough for four hours to remove any dissolved oxygen. When cooling was employed, ice was placed in the cooling jacket surrounding the reaction vessel.

Immediately prior to polymerization, the desired amounts of the catalyst components were withdrawn into syringes in the dry box, removed from the dry box, and injected into the reactor via the serum cap and side arm 19.

The agitator 17 was activated prior to and during catalyst addition in order to ensure good mixing thereof with the polymerization solvents. Either during addition of the catalyst or upon the completion of the addition of the catalyst, the olefin monomer to be polymerized was introduced into the reaction vessel via conduit 20 at a rate of 1–6 liter per minute at 70°F, at atmospheric pressure. Excess olefin monomer was withdrawn through conduit 22.

Upon completion of a run, the reaction was terminated by adding 10 milliliters of isopropyl alcohol. The reactor contents were then poured into a beaker containing isopropyl alcohol, filtered, washed with 10 percent HCl in methanol, rinsed several times with isopropyl alcohol, and dried in a vacuum oven at aspirator pressure and 40°–50°C. The contents were then weighed and reported as grams of polymer yield.

The separation of the fibers from polymer granules or "crumb" was carried out either by hand, or a separation technique based upon the difference in density of the fibers and crumb which exists prior to washing. This latter procedure was effected by placing the unwashed polymer in an ethanol-water density gradient column. The catalyst residues on the fibers wash off immediately; however, the catalyst residues are trapped in the crumb as evidenced by their yellow color. Due to the higher density of the crumb, they sink to the bottom of the density gradient column while the fibers float.

The materials employed in the polymerization will be briefly described.

Purified nitrogen obtained from Air Reduction Company and having typical specification of 1–2 ppm oxygen and 1–2 ppm water was used to blanket all distillations, catalyst preparations and polymerizations. When employed in flushing equipment or for blanketing the polymerization it was first passed through a Matheson Model 450 (molecular sieve). The nitrogen employed in the dry box was recirculated at a rate of 1.1 cubic feet/minute through 2 molecular sieve columns (Linde 5A and 13X)

The ethylene monomer employed in the examples was either a Matheson CP grade purified by passing through a granular $P_2O_5$ followed by bubbling through a tower of Na-K benzophenone ketyl and tetralin (example 11) or Phillips ethylene (pure grade), minimum specifications, 99 mole percent, 5 ppm oxygen, and 10 ppm water (passed through a Matheson Model 450 purifier) employed in the remaining ethylene examples.

In the examples employed decalin as the solvent, Aldrich No. D-25 was employed and purified by washing three to four times with concentrated sulfuric acid, water and aqueous bicarbonate, followed by filtering through $CaCl_2$. Following purification, the decalin was stored over Drierite. Prior to employment in the polymerization reaction, it was stirred over calcium hydride for several days and then distilled; these operations were carried out under a nitrogen blanket. The decalin and other solvents employed were transferred to the polymerization vessel under nitrogen via an all-glass transfer system.

The titanium tetrachloride employed in Example 11 was Matheson, Coleman and Bell's practical grade, that employed in the other examples was MC & B pure grade. These were used without further purification as was the triethyl aluminum (K and K) and the diethyl aluminum chloride (Texas alkyls.) The titanium trichloride employed was Stauffer Chemical Company's AA grade. The vanadium oxytrichloride was obtained from Stauffer Chemical Company, and the vanadium tetrachloride was obtained from Research Organic/Inorganic Chemicals Company.

The percent crystallinity of the fibers and the nonfibrous polymer (crumb) was obtained by measuring the enthalpy of melting with a Perkin DSC-1 B, a differential scanning calorimeter. The value obtained was then divided by 69.4 calories per gram, the value for 100 percent crystalline polyethylene. The crystalline melting points ($T_m$) were taken as the peak of the enthalpy curve. The scanning rate was 2.5°/minute.

Molecular weight distributions were obtained using a Waters Gel Permeation Chromatography apparatus.

Viscosity average molecular weights were determined by measuring the specific viscosity in decalin at 135°C using Ubbelohde No. 50 viscometers, and calculating the viscosity average molecular weight from the following relationship:

$$(\eta) = K M_v^a$$

where $(\eta)$ = intrinsic viscosity, and is determined by Martin's equation (set forth on p. 207 of the book "Addition Polymers" by D. A. Smith, Plenum Press, N.Y. 1968. In Martin's equation, the $k$ for high density polyethylene has been determined empirically to be 0.63 and for polypropylene to be 0.81). The specific viscosity used in Martin's equation was usually first corrected for shear rate, using the relationship of Francis et al (J. Polymer Sci., 31, 453 (1958)

K = constant, from literature a = constrant from literature For polyethylene, the values of Chiang, (J. Polym. Sci., 36, 91 (1959) were used; for polypropylene, the values of Redlich were used (J. Polym. Sci., Al, 393 (1963)

In the examples below, the following codes are employed.

$a = TiCl_4 + Et_3Al$
$b = TiCl_4 + Et_2AlCl$
$c = TiCl_3 + Et_2AlCl$
$d = VOCl_3 + Et_3Al$
$e = VCl_4 + Et_3Al$
$f = $ (Ti or V)X added first
$g = $ R-Al added first In the data reported in the examples below, ranges are given for temperature, mixer rpm, shear stress, and Reynolds number since these varied during the course of the polymerization. The shear rate varied because fiber build-up on the blades of the agitator caused them to slow down. Therefore, fibers were formed when the shear rate was above the minimum required for fiber formation even though during the latter part of a run the shear rate may have dropped below the minimum value. The solubility parameter and $(\delta_s - \delta_p)^2$ are reported as ranged since these varied with temperature.

In the examples, C-hex is cyclohexane, dec. is decalin. xyl is xylene, and hep. is heptane.

In all of the examples, the reaction rate is reported as m.moles of monomer consumed (calculated from the differential between the inlet and outlet rotometer)/(m.mole of catalyst) (second).

B. Examples of different solvents

The examples set forth in the following Table 1 illustrate the employment of various solvents in the polymerization reaction.

The monomer employed was ethylene. The rate of monomer addition was about 1.0 liter per minute for examples 2 to 4 and about 6 liters per minute for example 1.

Table 1

| Example No. | 1 | 2 | 3 | 4 |
|---|---|---|---|---|
| Catalyst | a | a | a | a |
| Catalyst age (min) | none | 10 | none | none |
| Ti (m moles/l.) | 2.5 | 4 | 2.5 | 2.5 |
| Al/Ti | 3 : 1 | 3 : 1 | 3 : 1 | 3 : 1 |
| Order of addition | f | f | f | f |
| Solvent | C—hex. | dec. | xyl. | hep. |
| Temperature, °C | 28 – 80 | 28 – 46 | 20 – 70 | 75 – 98 |
| Mixer, RPM × $10^{-3}$ | 7.8 – 6.8 | 3 – 2.1 | 6 – 6.2 | 7.8 – 7.4 |
| Shear stress, lb/ft.² | 6 – 3.3 | 2.5 – 1.3 | 2.9 – 4.0 | 2.9 – 2.5 |
| Reynolds No. × $10^{-3}$ | 83 – 148 | 13 – 12.5 | 96.6 – 158 | 237 – 260 |
| Sol parameter ($\delta_s$) | 8.2 – 7.5 | 8.4 – 8.3 | 8.9 – 8.3 | 6.8 – 6.5 |
| $(\delta_s-\delta_p)^2$ | .0046–.023 | .15 – .14 | .09 – .32 | 1.45 – 1.86 |
| Reaction rate | 2.7 | 0.05 | 2.45 | 4.1 |
| Polymer yield, gms | 22.5 | 2.8 | 23.6 | 14.5 |
| % Fiber | 30 | 100 | 100 | 100 |
| % crystallinity fiber | 71 | 75 | 58 | 64 |
| crumb | — | — | — | — |
| Melting Pt. (Tm.)°C fiber | 128 | 134 | 136 | 129 |
| Crumb | — | — | — | — |

C. Catalyst systems

The following examples illustrate the employment of various Ziegler-type catalysts in the practice of the process of the present invention: The olefin employed was ethylene. The monomer was added at a flow rate of about 1.0 liter per minute in Examples 5-7 and 9. The flow rate was about 6.0 liters per minute for Example 8.

TABLE 2

| Example No. | 5 | 6 | 7 | 8 | 9 |
|---|---|---|---|---|---|
| Catalyst | a | b | c | d | e |
| Catalyst age | 10 | 30 | 30 | none | none |
| Ti or V (m moles/l.) | 4 | 10 | 1.0 | 2.5 | 6 |
| Al/Ti or Al/V | 3 : 1 | 0.43 : 1 | 3 : 1 | 3 : 1 | 2 : 1 |
| Order of addition | f | g | g | f | f |
| Solvent | dec. | dec. | dec. | dec. | dec. |
| Temperature, °C | 28 – 46 | 66 – 93 | 104 – 110 | 30 – 50 | 28 – 31 |
| Mixer, RPM × $10^{-3}$ | 3 – 2.1 | 3.5 – 2.8 | 11.1 | 7.7 – 4.8 | 7 – 1.6 |

TABLE 2 — Continued

| Example No. | | | Different Catalysts | | |
|---|---|---|---|---|---|
| | 5 | 6 | 7 | 8 | 9 |
| Shear stress, lb/ft.$^2$ | 2.5 – 1.3 | 1.7 – 1.5 | 10 | 10 – 3 | 9 – 1 |
| Reynolds No. × 10$^{-3}$ | 13 – 125 | 22 – 46 | 138 – 149 | 34 – 27 | 30 – 15 |
| Sol Parameter ($\delta_s$) | 8.4 – 8.3 | 7.7 – 8.1 | 7.7 – 7.6 | 8.4 – 8.2 | 8.4 – 7.9 |
| ($\delta_s - \delta_p$)$^2$ | .149 – .137 | .08 – .11 | .08 | .149 – .126 | .160 – .106 |
| Reaction rate | 0.05 | — | — | 0.63 | 1.61 |
| Polymer yield, gms | 2.8 | 0.02 | 0.02 | 4.8 | 18.6 |
| Fiber % | 100 | 85 | 30 | 100 | 40 |
| % crystallinity, fiber | 75 | 43 | 34 | 73 | 64 |
| Melting Pt.(Tm.)°C, fiber | 134 | 128 | 140 | 128 | 130 |

It is seen from the foregoing Table 2 that various combinations of catalysts and co-catalysts of the Ziegler-type may be employed in obtaining fibers under the conditsions of the present invention.

In addition to those Ziegler-type catalyst systems specifically illustrated, other Ziegler-type catalyst systems may be employed. For example, three component compounds are added to the catalyst system to produce polyolefin fibers. These appear to have special utility where propylene is the olefin.

D. CATALYST AND CO-CATALYST RATIOS

The examples set forth in the following Table 3 illustrate various ratios of catalyst to co-catalyst which may be employed in producing the fibers of the present invention: The olefin employed was ethylene. The monomer was added to the reaction medium at a flow rate of about 1.0 liter per minute in all of the examples.

It is seen from the foregoing examples that the aluminum alkyl: titanium halide ratio may be varied over a wide range to produce polyolefin fibers.

E. VARIATION OF THE DEGREE OF SHEAR STRESS OF THE POLYMERIZATION MASS.

The examples set forth in Table 4 below illustrate the importance of high shear stress to effect the formation of fibers in accordance with the present process. Note that where the shear stress is below about 1.5 lb(f)/ft$^2$ (as in examples 14 and 15) no fibers are formed. Where the shear stress exceeds 1.5 lb(f)/ft$^2$ fibers are obtained. The olefin employed was ethylene. The monomer was added at a flow rate of about 1.0 liter per minute in all examples.

TABLE 3

| Example No. | | Catalyst Ratio Varied | | |
|---|---|---|---|---|
| | 10 | 11 | 12 | 13 |
| Catalyst | b | a | a | a |
| Catalyst age | 30 | 30 | 10 | 45 |
| Ti (m moles/l) | 10 | 6.7 | 4 | 10 |
| Al/Ti | 0.43 | 1.6 | 3 | 6 |
| Order of addition | g | f | f | g |
| Solvent | dec. | dec. | dec. | dec. |
| Temperature, °C | 70 – 90 | 24 – 94 | 28 – 45 | 99 – 117 |
| Mixer, RPM × 10$^{-3}$ | 3.5 – 2.8 | 12 – 0 | 3 – 2 | 9.4 – 8.9 |
| Shear stress lb. (f)/ft.$^2$ | 1.7 – 1.5 | 19 – 12 | 1.9 – 1.1 | 8 – 6.6 |
| Reynolds No. × 10$^{-3}$ | 22 – 46 | 54 – 0 | 11 – 13 | 110 – 126 |
| Sol parameter ($\delta_s$) | 7.7 – 8.1 | 8.4 – 7.8 | 8.4 – 8.3 | 7.8 – 7.6 |
| ($\delta_s - \delta_p$)$^2$ | .08 – .11 | .10 – .16 | .13 – .15 | .09 – .08 |
| Reaction rate | — | — | 0.05 | — |
| Polymer yield, gms | 0.02 | 95 | 2.8 | 0.2 |
| % fiber | 85 | 50 | 100 | 8 |
| % Crystallinity, fiber | 48 | 69 | 75 | — |
| Melting Point (Tm°C), fiber | 128 | 132 | 134 | — |

TABLE 4

| Example No. | | | Varying Shear Stress | | | |
|---|---|---|---|---|---|---|
| | 14 | 15 | 16 | 17 | 18 | 19 |
| Catalyst | a | a | a | a | a | a |
| Catalyst age | 0 | 10 | 10 | 10 | 10 | 0 |
| Ti (m moles/l.) | 4 | 2 | 4 | 2.5 | 2.5 | 2 |
| Al/Ti | 3 | 3 | 3 | 3 | 3 | 3 |
| Order of addition | f | g | f | f | f | g |
| Solvent | dec. | dec. | dec. | dec. | dec. | dec. |
| Temperature, °C | 28 | 29 | 28 – 45 | 60 – 68 | 71 – 94 | 28 – 97 |
| Mixer RPM × 10$^{-3}$ | 0 | 1.4 | 3 – 2.1 | 4 – 5 | 8 | 11.6 – 4.7 |
| Shear stress lb. (f)/ft.$^2$ | 0 | 0.7 – 1.0 | 2.5 – 1.5 | 4.1 – 2.6 | 7.9 – 3.4 | 19 – 3 |
| Reynolds No. × 10$^{-3}$ | 0 | 5.7 – 7.2 | 11 – 13 | 36 – 32 | 76 – 51 | 50 – 99 |
| Sol Parameter ($\delta_s$) | 8.4 | 8.4 | 8.4 – 8.3 | 8.1 | 8.0 – 7.8 | 8.4 – 7.8 |
| ($\delta_s - \delta_p$)$^2$ | .15 | .15 | .15 – .13 | .09 | .11 – .09 | .16 – .09 |
| Polymer yield, gms | 0.1 | 0.1 | 2.8 | 1.1 | 1.6 | 16.2 |
| % Fiber | 0 | 0 | 100 | 100 | 100 | 90 |
| % Crystallinity fiber | — | — | 75 | 71 | 60 | 65 |
| Melting Pt. (Tm°C) fiber | — | — | 134 | 135 | 134 | 127 |
| Reaction rate | 0.001 | 0.2 | 0.05 | 0.14 | 0.098 | — |

F. VARIATION OF THE REACTION RATE

The examples set forth in Table 5 below illustrate the effect of reaction rate on polyethylene fiber formation. In examples 20 and 21 the reaction conditions are very similar except for reaction rate, and likewise in examples 22 and 23 the reaction conditions are very similar except for reaction rate. Fibers were obtained in example 20 but not in example 21 due to the reaction rate being too low in example 21. The reaction rate in example 21 was lower than the reaction tion rate in example 20, apparently due to the lower reaction temperature employed in example 21. Likewise, fibers were obtained in example 22 but not in example 23 due to the reaction rate of example 23 being too low. The lower reaction rate of example 23 appears to have been due to the lower agitation of the reaction medium in example 23, as seen by a comparison of the shear rates of examples 22 and 23.

various of the examples set forth above (except Example 25, which is discussed in detail later):

Table 6

| Ex. No. | Molecular Weight × 10⁻⁶ | | | | |
|---|---|---|---|---|---|
| | $(\mu)$ | $\bar{M}_r$ | $\bar{M}_w$ | $\bar{M}n$ | $\bar{M}_w/Mn$ |
| 1 | 7.7 | 1.100 | 0.341 | 0.00394 | 86.5 |
| 2 | 4.1 | 0.436 | — | — | — |
| 3 | .9 | 1.400 | — | — | — |
| 4 | 4.2 | 0.450 | 0.232 | 0.00170 | 135 |
| 7 | 6.7 | 0.900 | — | — | — |
| 8 | 4.8 | 0.550 | 0.368 | 0.00418 | 88 |
| 9 | 7.3 | 1.030 | 0.310 | 0.00420 | 74 |
| 11 | 6.7 | 0.900 | 0.348 | 0.00880 | 39.7 |
| 13 | 4.7 | 0.500 | — | — | — |
| 14 | 4.0 | 0.420 | 0.175 | 0.00280 | 63 |
| 18 | 5.0 | 0.590 | — | — | — |
| 19 | 5.7 | 0.720 | — | — | — |
| 21 | 5.9 | 0.760 | — | — | — |
| 22 | 7.4 | 1.060 | 0.318 | 0.006 | 53 |
| 23 | 15.3 | 3.100 | — | — | — |
| 25 | 9.0 | 1.420 | — | — | — |

TABLE 5

| Example No. | Variation of Reaction Rate | | | |
|---|---|---|---|---|
| | 20 | 21 | 22 | 23 |
| Catalyst | a | a | a | a |
| Catalyst age | 0 | 0 | 0 | 10 min |
| Ti (m moles/l.) | 2.5 | 2.5 | 1.0 | 1.0 |
| Al/Ti | 3 | 3 | 3 | 3 |
| Order of addition | f | f | f | f |
| Solvent | n—hept. | n—hept | isooctane | isooctane |
| Temperature, °C | 75 – 98 | 17 – 33 | 32 – 85 | 33 – 57 |
| Mixer, RPM × 10⁻³ | 7.4 – 7.8 | 6.1 – 6.8 | 5.2 – 5.6 | 3.8 – 4.1 |
| Shear stress, lb.(f)/ft² | 2.5 – 3 | 2.5 – 3 | 1.8 – 2.2 | 1.34 – 1.49 |
| Reynolds No. × 10⁻³ | 235 – 257 | 113 – 156 | 93 – 146 | 69 – 91 |
| Sol Parameter ($\delta_s$) | 6.4 – 67 | 7.2 – 7.5 | 6.1 – 6.7 | 6.5 – 6.7 |
| $(\delta_s-\delta_p)^2$ | 1.4 – 1.8 | .65 – .93 | 2.1 – 3.0 | 2.2 – 2.5 |
| Polymer yields | 14.5 | 9.0 | 31.3 | 9.4 |
| % Fiber | 100 | 0 | 100 | 0 |
| % Crystallinity, fiber | 60 | 61 | 59 | 67 |
| Melting Pt. (Tm°C), Fiber | 127 | 131 | 135 | 137 |
| Reaction rate | 4.1 | 1 | 9.2 | 1.09 |

G. POLYPROPYLENE FIBER PRODUCTION

The following example 24 illustrates the polymerization of propylene into polypropylene fibers in accordance with the present invention. The propylene monomer was added at a flow rate of about 1.0 liter per minute.

Example 24

| | |
|---|---|
| Catalyst | AlEt₃/TiCl₃ |
| Catalyst age | 0 |
| Ti(m moles/l) | 2.5 |
| Al/Ti | 1.8 : 1 |
| Order of addition | f |
| Solvent | dec. |
| Temperature, °C | 65 |
| Mixer, RPM × 10⁻³ | 8.0 |
| Shear stress, lb(f)ft² | 7.7 – 8.1 |
| Reynolds No. × 10⁻³ | 61 – 59 |
| Sol. parameter ($\delta_s$) | 8.1 |
| Reaction rate | 0.071 |
| Polymer yield, gms | 0.1 |
| % fiber | 40 |
| $(\delta_s-\delta_p)^2$ | 0.48 |

MOLECULAR WEIGHT OF NASCENT POLYOLEFIN FIBER MOLECULES

The molecular weights of the polyolefin molecules produced in accordance with the present invention range from about one-half million to about ten million. The following table sets forth the intrinsic viscosity ($\eta$) and viscosity average molecular weights ($\bar{M}_r$) weight average molecular weights ($\bar{M}_w$), number average molecular weights ($\bar{M}_n$) and $\bar{M}_w/\bar{M}_n$ ratio determined for The viscosity average molecular weight of all of the foregoing examples is in excess of about 400,000 and usually in excess of about one-half million. This corresponds to an intrinsic viscosity greater than about 4.0 dl/gram, preferably greater than about 5.0 dl/gram. Alternatively stated, the melt index of the present high molecular weight polyolefins (as measured by ASTM D-1238-62T) is zero.

FIBER MORPHOLOGY

Before describing some of the various fiber morphologies obtained by the process of the present invention it should be emphasized that the size and morphology of the polyolefin fibers obtained depend upon the various process conditions employed and particularly the degree of shear imposed upon the polymerizing mass. Generally, as the shear stress increases, fibers of longer length are obtained. In addition, the various fibers obtained in a single run will vary from fiber to fiber both in morphology and size and it is believed that this difference is due to local variations at the situs of polymer formation which are inherently present. Fibers of varying size and morphology are, in fact, desirable where the fibers are to be employed in making a nonwoven web and is analagous to the situation found with natural cellulosic papermaking fibers or textile fibers. Natural fibers most suitable for papermaking have an average length of 3 mm or longer and fibers for textile uses generally have an average length longer than 15 mm.

With the foregoing in mind, reference is made to FIGS. 2 to 5 wherein the principal fiber morphologies obtained are illustrated.

The morphological type illustrated in FIG. 2 is termed the "macro-fibril bundle type". The fiber 40 is cylindrical in shape and is made up of a bundle of macro-fibrils 41 illustrated in FIG. 2 as being teased apart at one end thereof for purposes of illustration. The phase "macro-fibril" is employed to distinguish over the "fibrils" described by various researchers for polyolefin spherulites, shish-kabobs, etc. The fibrils thus referred to in the prior art are on the order of 300 to 10,000 angstrom units (0.03–1.0 microns) in diameter and are usually visible only by employment of an electron microscope. In distinction to this macro- fibrils making up the fibers of the present invention are visible under an ordinary microscope and are substantially larger than those of the prior art, generally being larger than about 1.0 micron in diameter. Some, but not all of the macrofibrils of fibers produced by the present invention appear to have portions that are made up of a microfibriller structure, i.e., fibrils having a diameter less than about 1.0 micron, when examined at 10,000 × with an electron microscope.

The morphological fiber-type illustrated in FIG. 3 is termed the ribbon type, and is a flattened fiber 50 made up of fibrils 51. The overall appearance of fiber 50 is that of a flattened ribbon rather than cylindrical-shaped. The width of this type of fiber has been observed to range from about 25 microns to about 350 microns.

The morphological-type illustrated in FIG. 4 is termed the "barbed" type and is comprised of a central fiber core 60 made up of macro-fibrils, the core having either spiked shape or hook shaped projections 61 extending from the surface thereof. The diameter of this type of fiber has been observed to range from about 20 microns to about 75 microns.

The other major morphological type of fiber obtained by the process of the present invention is illustrated in FIG. 5 and is termed the "mono-filament" type. This mophological type is comprised of a monofilament of polyolefin 70 and does not appear to be made up of macro-fibrils bundled together. The diameter of this type of fiber has been observed to range from about 20 microns to about 75 microns.

For purposes of comparison, it should be noted that Douglas fir cellulosic fibers have a diameter ranging from about 35 – 45 microns and a length of about 5.0 mm, and hemlock cellulosic fibers have diameters ranging from about 30 – 50 microns and a length of about 4.0 mm. It is thus seen that the fibers of the present invention have a diameter the same order of magnitude as natural cellulosic papermaking fibers.

It should be emphasized that other morphological type of fibers may be obtained beyond those illustrated in FIGS. 4 to 7; however, those illustrated appear to be the principal morphological types obtained.

The following table sets forth fiber length distributions for polyolefin fibers obtained in various polymerizations. Examples numbers refers back to those reported in previous tables, to which reference may be made for other data relating thereto. Example 2 is reported as weight percent of the sample and Examples 3 and 18 are reported as numerical percentages. Lengths were determined by microscopic examination.

Table 7

Fiber Length Distributions

| Example No. Fiber Length (inches) | Fiber Length (mm) | 2 % (wt) | 3 % by No. | 18 % by No. |
|---|---|---|---|---|
| <.01 – .06 | .25 – 1.5 | 10 | — | — |
| .06 – 0.2 | 1.5 – 5 | 10 | 58 | 66 |
| .2 – .5 | 5 – 12.5 | 80 | 26 | 19 |
| .5 – 1.0 | 12.5 – 25 | — | 14 | 10 |
| 1.0 – 1.5 | 25 – 37.5 | — | 2 | 2.5 |
| 1.5 – 2.0 | 37.5 – 50 | — | — | 1.5 |
| 2.0 – 3.0 | 50 – 75 | — | — | 0.5 |
| 3.0 – 4.0 | 75 – 100 | — | — | 0.25 |
| 4.0 – 5.0 | 100 – 125 | — | — | 0.25 |

As can be seen from the foregoing table, the fibers of the present invention have an average length greater than about 0.25 mm, and a majority of the fibers have an average length between about 1.5 and 12.5 mm.

The width or diameter of the fibers of the present invention has been observed to range from about 20 microns to about 400 microns.

The following table sets forth average length and coarseness measurements of some typical fibers in accordance with TAPPI standard test Nos. T232 Su-68 and T234 Su-67, respectively. The lengths are weight average lengths and coarseness is a measure of the average weight per unit length (milligrams per 100 meters and called a decigrex).

Table 8

| Example No. | Length | Coarseness |
|---|---|---|
| 1 | 0.62 | 24.4 |
| 2 | 1.65 | 99.5 |
| 4 | 0.74 | 79.4 |
| 8 | 2.58 | 128 |
| 11 | 2.55 | 120 |
| 12 | 1.65 | — |
| 22 | 1.85 | 33.7 |
| 25 | 2.55 | 29.9 |
| 3 | 0.9 | 43.0 |

The diameter of the fibrils making up the fibers of the present invention is, as mentioned previously, larger than about 1.0 micron and ranges up to about 65 microns. The following table sets forth some typical fibril diameters as measured by microscopic examination:

Table 9

| Example No. | Fibril Diameter microns |
|---|---|
| 2 | 14 |
| 4 | 65 |
| 8 | 8 |
| 18 | 30 |
| 22 | 10 – 40 |
| 25 | 8 – 63 |

A further feature of the fibers of the present invention are their large surface areas. Stable fibers made from melt spun filaments have surface areas less than 1.0 m²/gram. For example, 3 denier polyethylene staple has a surface area of about 0.2 m²/gram. The fibers of the present invention have surface areas in excess of 1.0 m²/gram, and up to 60 m²/gram or higher for samples rinsed in isopropanol, dried in a 45°C oven and vacuum dried. The following table sets forth some typical surface areas of fibers produced by some of the foregoing examples:

TABLE 10

| Example No. | Surface Area m²/gram |
|---|---|
| 1 | 10.7 |
| 2 | 1.4 |
| 3 | 9.7 |
| 4 | 8.4 |
| 7 | 57.4 |
| 8 | 2.7 |
| 9 | 33.1 |
| 13 | 2.6 |
| 17 | 2.8 |
| 18 | 28.7 |
| 19 | 6.7 |
| 21 | 11.4 |
| 22 | 7.7 |
| 25 | 5.3 |

The fibers of the present invention have a pore volume which is very favorable to high opacity and low bulk density, both desirable for papermaking fibers. Pore volume as discussed herein is measured with a Mercury Porosimeter, Model No. 57121 manufactured by American Instrument Company. As employed here, the pore volume is measured only for those pores having an apparent diameter between 0.5 and 0.012 microns. The pore volume of staple fibers is typically 0.02 cc/gram. The pore volume of the fibers of the present invention, prepared for measurement by washing out the reaction solvent with isopropanol and drying in a vacuum oven at 45°C, is typically between about 0.3 and 0.8 cc/gram. For example, the pore volume of the fibers of example 22 is 0.37 cc/gram and that of examples 4 and 20 is 0.47 cc/gram.

Figure 7:
Figure 8:
Figure 9:

FIGS. 6 to 10 are microphotographs of polyethylene fibers obtained by the process of the present invention. FIG. 6 is the type of fiber illustrated schematically in FIG. 2. The lower end of the fiber (as it appears in the microphotograph) has been teased apart to show the macro-fibril bundle type of morphology. FIG. 7 shows a plurality of fibers, and the macro-fibrillar structure thereof is easily seen. FIGS. 8 and 9 are microphotographs of ribbon types of morphological structure, and the macro-fibrils are plainly visible. FIG. 9 illustrates the barbed filament type of structure.

The fibers illustrated in FIGS. 6 and 7 were produced in accordance with Example 18. The fibers of FIGS. 8 and 9 were produced in accordance with Example 11. The data on the production of the fibers of FIG. 10 is set forth in the following table:

Table 11

Example 25

Figure 10:

Data on Fiber Production of FIG. 10

| Catalyst | a |
|---|---|
| Catalyst age (min) | 0 |

Table 11-Continued

Example 25

Data on Fiber Production of FIG. 10

| Ti (m moles/l) | 1.0 |
|---|---|
| Al/Ti | 3 |
| Order of addition | g |
| Solvent | dec. |
| Temperature, °C | 7 – 52 |
| Mixer, r.p.m. × $10^{-3}$ | 11.1 – 5.4 |
| Shear stress lb(f)/ft² | 22.5 – 5.0 |
| Reynolds No. × $10^{-3}$ | 56.7 – 29.7 |
| Sol. parameter $(\delta_s)$ | 8.6 – 8.2 |
| $(\delta_s-\delta_p)^2$ | .183 – .129 |
| Reaction rate | 0.118 |
| Polymer yield, gms | 3.9 |
| % fiber | 80 |
| % crystallinity (fiber) | 62 |
| Melting point $(T_m)$°C (fiber) | 138. |

UTILITY

The polyolefin fibers of the present invention have particular utility in the formation of nonwoven webs. Such webs may be water-laid from a non-aqueous liquid suspending medium, or air-laid. The polyolefin fibers for the present invention may be admixed with other fibrous or non-fibrous material to enhance the strength or appearance of such webs. The fibers may be spun into yarn for textile applications. The polyolefin fibers of the present invention may be employed as reinforcing in laminates, as insulation, in compressing molding applications, in coatings and in making filters. Practically any of those uses to which conventional fibers are applied may employ the fibers of the present invention.

I claim:

1. A process of producing fibers of polyolefins having high molecular weight comprising polymerizing a monomeric olefin at an apparent specific reaction rate greater than about 0.05 sec.$^{-1}$ and at a temperature less than the melt dissolution temperature of the polyolefin to be formed in the presence of a coordination catalyst system in a suitable reaction medium whose solubility parameter approaches the solubility parameter of the polyolefin to be formed while subjecting the reaction medium to a shear stress greater than about 0.1 lbs. (force)/sq.ft. to effect formation of a polyolefin in the form of individually separable fibers having a gross morphology and size similar to natural cellulosic papermaking fibers.

2. A process according to claim 1 wherein the olefin is selected from the group consisting of ethylene, propylene and mixtures thereof.

3. A process according to claim 1 wherein the solubility parameter of the reaction medium is between about 6.0 and 10.0 (cal./cc)$^{1/2}$.

4. A process according to claim 1 wherein the reaction medium is a composition selected from the group consisting of cyclohexane, decalin, heptane, tetralin, m, o and p-xylene, chlorinated solvents, toluene, hexane, isooctane, mineral oils and mixtures thereof.

5. A process according to claim 1 wherein the catalyst system comprises a Ziegler-type catalyst wherein the catalyst is selected from the group consisting of titanium trichloride, titanium tetrachloride, vanadium tetrachloride and vanadium oxytrichloride, and the cocatalyst is selected from the group consisting of diethyl aluminum chloride and triethyl aluminum.

6. A process according to claim 1 wherein the reaction mass is maintained under a pressure of from about 1 to about 10 atmospheres.

7. A process according to claim 1 wherein the shear stress is imparted to the reaction mass by agitation.

8. A process according to claim 1 wherein an excess of monomeric olefin is employed.

9. A process according to claim 1 wherein the polyolefin formed has a viscosity average molecular weight greater than about 500,000.

10. A process according to claim 1 wherein the components of the coordination catalyst system are added separately to the reaction medium.

11. A process according to claim 10 wherein the coordination catalyst system is formed in the reaction medium in the presence of the olefin.

12. A process according to claim 1 wherein the catalyst concentration is between about 0.05 and 1.0 mmol./liter.

13. A process according to claim 1 wherein the catalyst concentration is between about 1.0 and 10.0 mmol./liter.

14. A process of producing fibers of polyolefins comprising polymerizing a monomeric olefin selected from the group consisting of ethylene, propylene and mixtures thereof at an apparent specific reaction rate greater than about 0.05 sec.$^{-1}$ and at a temperature less than the melt dissolution temperature of the polyolefin to be formed in the presence of a coordination catalyst system in a reaction medium whose solubility parameter is between about 6.0 and 10.0 (cal./cc)$^{1/2}$ while subjecting the reaction medium to a shear stress greater than about 0.1 lbs.(force)/sq.ft. to effect the formation of individually separable fibers of a polyolefin having a viscosity average molecular weight greater than about 500,000, the fibers having a gross morphology and size similar to natural cellulosic papermaking fibers.

15. The process of claim 1 wherein the polymerization is carried out in the absence of a chain transfer agent in order to form a polyolefin having a zero melt index.

16. The process of claim 14 wherein the polymerization is carried out in the absence of a chain transfer agent in order to form a polyolefin having a zero melt index.

17. The process of claim 14 wherein the fibers have a length between about 0.01 inch and 5.0 inches, a diameter between about 20 and 400 microns, and are predominently made up of bundles of macrofibrils.

* * * * *